(12) United States Patent
Zhou et al.

(10) Patent No.: US 8,997,790 B2
(45) Date of Patent: Apr. 7, 2015

(54) TOUCH SWITCH OUTLET MECHANISM

(75) Inventors: Huasong Zhou, Xiamen (CN); Libin Shen, Xiamen (CN); Jianmin Chen, Xiamen (CN); Bin Cao, Xiamen (CN)

(73) Assignees: Huasong Zhou, Xiamen (CN); Xiamen Solex High-Tech Industries Co., Ltd., Xiamen (CN)

( * ) Notice: Subject to any disclaimer, the term of this patent is extended or adjusted under 35 U.S.C. 154(b) by 114 days.

(21) Appl. No.: 13/811,017

(22) PCT Filed: Aug. 16, 2011

(86) PCT No.: PCT/CN2011/078451
§ 371 (c)(1),
(2), (4) Date: Jan. 18, 2013

(87) PCT Pub. No.: WO2012/022250
PCT Pub. Date: Feb. 23, 2012

(65) Prior Publication Data
US 2013/0119286 A1 May 16, 2013

(30) Foreign Application Priority Data

Aug. 17, 2010 (CN) .......................... 2010 1 0255565
Aug. 17, 2010 (CN) ....................... 2010 2 0294497 U

(51) Int. Cl.
| | |
|---|---|
| *F16K 11/22* | (2006.01) |
| *A47K 3/00* | (2006.01) |
| *A62C 31/00* | (2006.01) |
| *F16K 31/44* | (2006.01) |
| *B05B 1/16* | (2006.01) |
| *B05B 1/18* | (2006.01) |

(52) U.S. Cl.
CPC ............... *F16K 31/44* (2013.01); *B05B 1/1636* (2013.01); *B05B 1/18* (2013.01)

(58) Field of Classification Search
USPC ..................... 137/861, 872, 883, 862; 4/615;
239/445, 444, 447, 448, 449
See application file for complete search history.

(56) References Cited

U.S. PATENT DOCUMENTS 2,663,539 A * 12/1953 Kersten et al. ................ 137/467
3,486,517 A * 12/1969 Gaura ............................ 137/832
3,552,436 A * 1/1971 Stewart ........................ 137/883
(Continued)

FOREIGN PATENT DOCUMENTS

CN 201115835 Y 9/2008
CN 201482594 U 5/2010
(Continued)

*Primary Examiner* — John Fox
*Assistant Examiner* — Michael R Reid
(74) *Attorney, Agent, or Firm* — Rabin & Berdo, P.C.

(57) ABSTRACT

A touch switch outlet mechanism has a fixation unit and a switch unit. The fixation unit includes an inlet waterway connected to the water source, a water diversion cavity connected to the inlet waterway, N number of water diversion holes connected to the water diversion cavity and several outlet functions with same number as the water diversion holes and one to one corresponding to the water diversion holes, N is equal to or more than 2; The switch unit includes N−1 number of sealing balls and N touch buttons, the N touch buttons are separately disposed with a touch end inside the water diversion cavity and a controlled end controlled by the user, the touch ends of the N touch buttons corresponding to N water diversion holes and sliding connected to the fixation unit, the N−1 sealing balls can close N−1 of the N water diversion holes.

13 Claims, 8 Drawing Sheets

(56) References Cited

U.S. PATENT DOCUMENTS

| | | | |
|---|---|---|---|
| 3,575,210 A * | 4/1971 | Fussell | 137/861 |
| 4,303,201 A * | 12/1981 | Elkins et al. | 239/381 |
| 7,854,401 B2 * | 12/2010 | Malek | 239/600 |
| 2006/0102747 A1 | 5/2006 | Ho | |
| 2010/0122409 A1 * | 5/2010 | Qiu | 4/615 |
| 2010/0155639 A1 * | 6/2010 | Zhou | 251/213 |
| 2010/0301141 A1 * | 12/2010 | Pan | 239/449 |
| 2012/0012215 A1 * | 1/2012 | Lee | 137/861 |

FOREIGN PATENT DOCUMENTS

| | | |
|---|---|---|
| CN | 101905198 A | 12/2010 |
| CN | 201664641 U | 12/2010 |

\* cited by examiner

TOUCH SWITCH OUTLET MECHANISM

FIELD OF THE INVENTION

The present invention relates to a sanitary ware, especially to a touch switch outlet mechanism.

BACKGROUND OF THE INVENTION

The existing switch outlet mechanism, for example utility model in the Chinese database with application number CN200920139283.2 of a rotation switch outlet shower, is switched and realized by the cooperation of a rotation body and a water diversion body and the sealing ball closed the outlet. But the touch switch principle is not described, making it switched without intuition.

SUMMARY OF THE INVENTION

The present invention is provided with a touch switch outlet mechanism, which solves the problems of the existing switch outlet mechanism that the switch is not intuitive.

The technical proposal of the present invention to solve the technical problem is as below:

A touch switch outlet mechanism includes a fixation unit and a switch unit;

The fixation unit includes an inlet waterway connected to the water source, a water diversion cavity connected to the inlet waterway, N water diversion holes connected to the water diversion cavity and several outlet functions with same number as the water diversion holes and one to one corresponding to the water diversion holes, N is equal to or more than 2;

The switch unit includes N-1 number of sealing balls and N number of touch buttons, the N number of touch buttons are separately disposed with a touch end inside the water diversion cavity and a controlled end, the touch ends of the N touch buttons are corresponding to N number of water diversion holes and sliding connected to the fixation unit, the N-1 number of sealing balls can seal up N-1 number of the N number of water diversion holes, the switch of the water diversion holes to connect to the water diversion cavity is realized by the sealing balls moving from one of the water diversion holes to another one by the sliding of the touch button.

In another preferred embodiment, each touch button is disposed with a restore spring withstanding the touch end of the touch button.

In another preferred embodiment, the present invention further includes a water diversion unit disposed inside the fixation unit, the water diversion unit includes a first water diversion plate and a second water diversion plate disposed up and down.

In another preferred embodiment, the water diversion cavity is disposed inside the first water diversion plate, the water diversion holes are opened in the surface of the first water diversion plate, the surface of the second water diversion plate is disposed with inlet grooves one by one corresponding to the water diversion holes.

In another preferred embodiment, the present invention further includes a limiting unit, the limiting unit is disposed inside the water diversion cavity.

In another preferred embodiment, the limiting unit includes limiting mechanisms with same number as the touch buttons, each limiting mechanism includes a sleeve body and two extending sections, the two extending sections are separately extended out of one end of the sleeve body in opposite directions, the extending sections are cooperated to form a ring wall with gaps surrounded the water diversion holes.

In another preferred embodiment, the sleeve bodies are separately disposed with a horizontal through hole, the touch ends are separately sleeved inside the through holes and extended out of the through holes into the water diversion cavity.

In another preferred embodiment, the sealing ball is bigger than the aperture of the water diversion hole.

In another preferred embodiment, the fixation unit is a shower, which includes a handle, the inlet waterway is disposed inside the handle.

In another preferred embodiment, an outlet cover is disposed in the lower of the fixation unit, each inlet groove is disposed with an outlet hole to connect to different outlet functions of the outlet cover.

In another preferred embodiment, the present invention includes three touch buttons, the controlled ends of which are buttons.

In another preferred embodiment, the three touch buttons are disposed in a line.

In another preferred embodiment, the touch buttons in the two sides of the three touch buttons are of symmetry and separately disposed with a button, a touch rod, a restore spring, a shaft and a rocker arm; the touch rod includes a straight section, a middle section and a pushing section, the button is disposed in the top end of the straight section; the rocker arm is kept by the shaft, the restore spring is sleeved in the touch end in the lower end of the rocker arm.

Compared to the existing technology, the touch switch outlet mechanism of the present invention has advantages as below:

1. As the outlet mechanism is disposed with touch buttons and sealing balls, people can directly touch the corresponding touch button to control the sealing ball to seal up the water diversion holes that are not corresponding to the touch button, and the rest diversion hole is connected to the corresponding the outlet function, making the switch more novel and easy and according to the humanity design trend.

2. The number of the sealing balls is one less than that of the water diversion holes, so that there is one water diversion hole left to connect to the water diversion cavity to make the corresponding outlet function connected.

3. As the restoring spring withstands the touch end, when the controlled end is touched to drive the touch end to push the sealing ball, the spring is compressed, when the sealing ball moves and stops pushing the controlled end, the spring releases and the touch end is repositioned.

4. The water diversion unit includes a first and a second water diversion plate disposed up and down and cooperated to form a water diversion cavity, water diversion hole and inlet holes to realize water diversion function, the structure is well arranged.

5. As a limiting unit is disposed inside the water diversion cavity, the limiting mechanisms of the limiting unit are cooperated to form a ring wall surrounded the water diversion holes, the sealing balls are disposed inside the ring wall to limit the sealing ball and easily controlled.

6. As the sleeve body is disposed with a through hole, the touch end can sliding and sleeved inside the through hole and extended to the water diversion cavity to control the sealing ball.

7. The diameter of the sealing ball is bigger than the aperture of the water diversion hole, so that the water diversion holes can be sealed well.

BRIEF DESCRIPTION OF THE DRAWINGS

The present invention will be further described with the drawings and embodiments.

REFERENCE MARK

Figure 1:
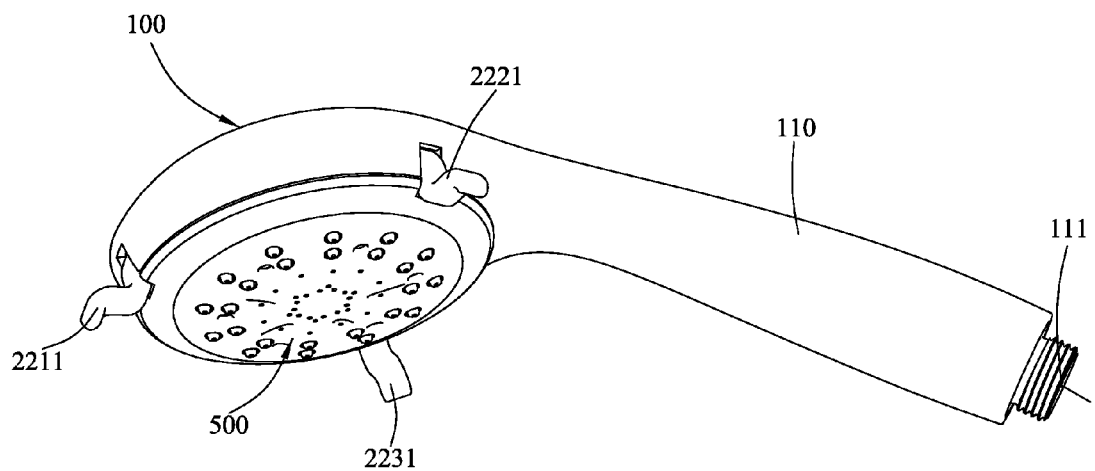
FIG. 1 illustrates the structure of the touch switch outlet mechanism of the first embodiment.

The fixation unit 100, the handle 110, the inlet waterway 111, the water diversion cavity 120, the first, second, third water diversion hole 131,132,133, the switch unit 200, the sealing ball 211, 212, the first, second ,third touch button 221,222,223, the first second third controlled end 2211,2221, 2231, the first, second, third touch end 2212, 2222, 2232, the first, second, third spring 2213,2223,2233, the first, second third pin 2214,2224,2234, the water diversion unit 300, the first, second water diversion plate 310, 320, the first, second, third inlet groove 321,322,323, the limiting unit 400, the limiting mechanism 410,420,430, the outlet cover 500, the assembly groove 510, 520, 530

DETAILED DESCRIPTION OF THE EMBODIMENTS

The First Embodiment

Refer to the FIG. 1 to FIG. 6, which illustrate the touch switch outlet mechanism of the first embodiment of the present invention.

FIG. 1 illustrates the structure of the touch switch outlet mechanism, which is a shower. The fixation unit 100 of the shower includes a handle 110, an inlet waterway 111 connected to the water source and passing through the handle 110. The bottom of the fixation unit 100 is disposed with an outlet cover 500, the controlled end 2211, 2221, 2231 of the three touch button 221, 222, 223 with different outlet functions are separately disposed in the fixation unit 100.

Figure 2:
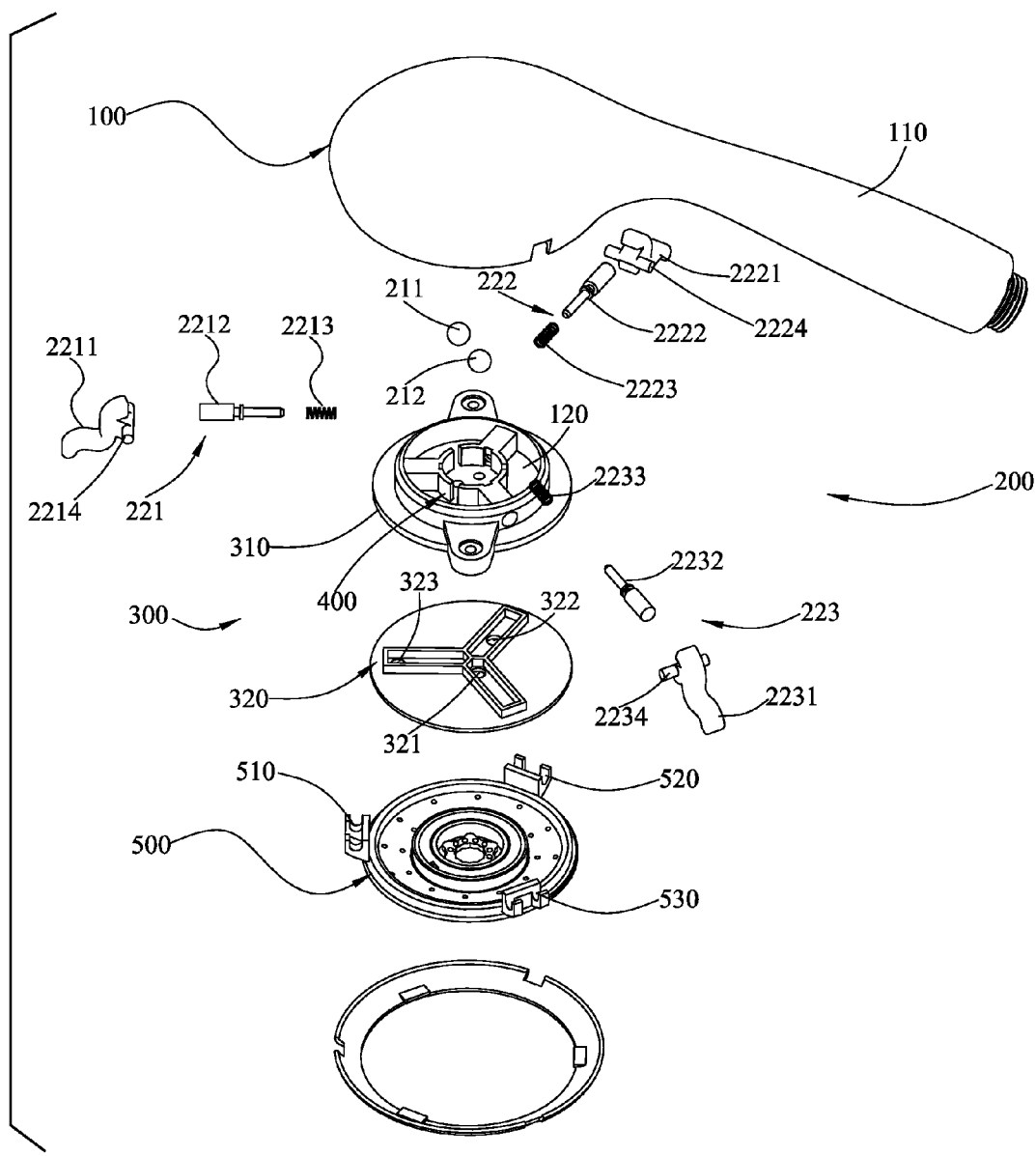
FIG. 2 illustrates the breakdown structure of the touch switch outlet mechanism of the first embodiment.
Figure 3:
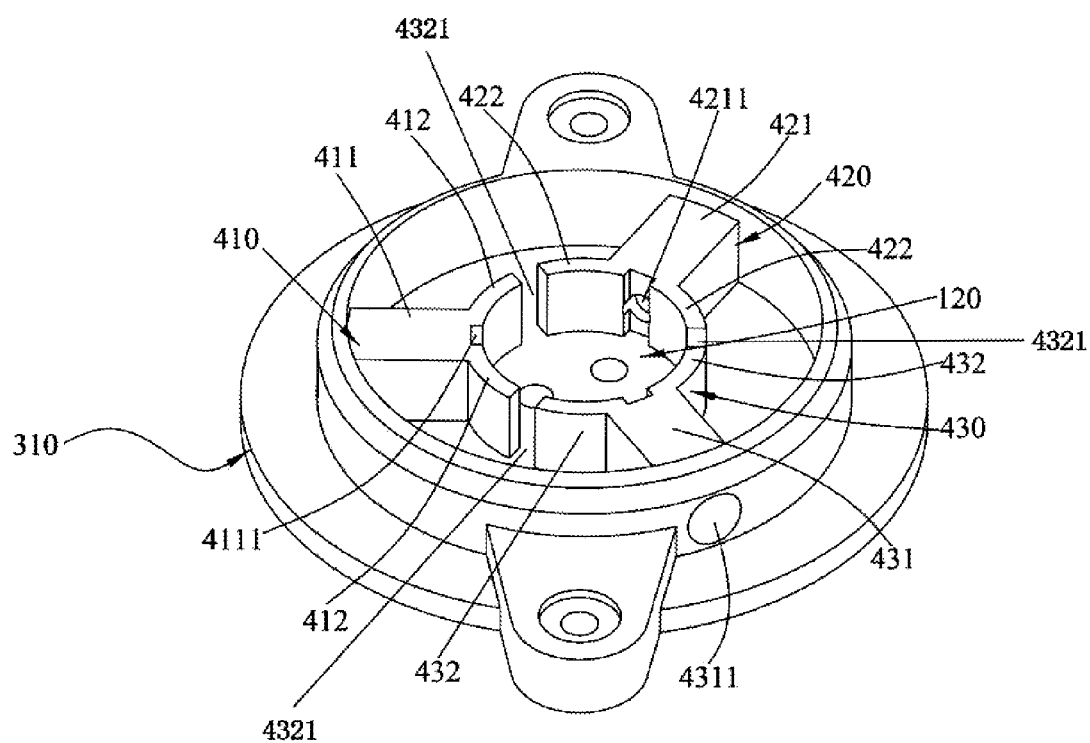
FIG. 3 illustrates the structure of the cooperation of the limiting unit and the water diversion unit of the first embodiment.

Combine with FIG. 2 and FIG. 3, the outlet mechanism includes a switch unit 200, a water diversion unit 300 and a limiting unit 400 thereinto:

The fixation unit 100 is further disposed with a water diversion cavity 120 connected to the inlet waterway 111. The surface of the water diversion cavity 120 is disposed with three water diversion holes 131, 132, 133. Each water diversion hole is corresponding to an outlet function. In this embodiment, the outlet functions are big water, needle-like water and small water.

The switch unit 200 is disposed inside the fixation unit 100 and disposed with sealing balls and touch buttons. There are two sealing balls 211, 212, which can be made of metal, rubber, glass or ceramic. The rubber sealing ball has better sealing effect. The diameter of the sealing balls 211, 212 is larger than the aperture of the water diversion holes 131, 132, 133 so as to close the any two of the three water diversion holes 131, 132, 133. The touch buttons 221, 222, 223 are separately disposed with a touch end 2212, 2222, 2232 inside the water diversion cavity 120 and a controlled end 2211, 2221, 2231. Each controlled end 2212, 2222, 2232 is sliding inside the fixation unit 100 and one to one corresponding to the three water diversion hole 131, 132, 133 and withstood with a restoring spring 2213, 2223, 2233. When one of the controlled end 2211, 2221, 2231 is touched to drive the corresponding touch end to push the sealing ball, the corresponding restoring spring is compressed and the sealing ball moves, stop touching the controlled end, the restoring spring releases the elastic force and the corresponding touch end is repositioned. The controlled end 2211, 2221, 2231 are fixed to the outlet cover 500 and extended out of the fixation unit 100 for user's operation. The controlled end 2211, 2221, 2231 are separately disposed with a pin 2214, 2224, 2234, which are one to one fixed to the assembly groove 510, 520, 530 on the inner surface of the outlet cover 500.

The water diversion unit 300 is disposed inside the fixation unit 100. The water diversion unit 300 includes a first water diversion plate 310 and a second water diversion plate 320. The first water diversion plate 310 is disposed with the water diversion cavity 120, the surface of the first water diversion plate 310 is disposed with three water diversion holes 131, 132, 133. The second water diversion plate 320 is fixed under the first water diversion plate 310 and disposed with three inlet groove 321, 322, 323 one by one connected to the water diversion holes. Each inlet groove is disposed with an outlet hole to connect to different outlet functions of the outlet cover 500.

Refer to the FIG. 3. The limiting unit 400 is disposed in the first water diversion plate 310 and inside the water diversion cavity 120. It includes three limiting mechanism 410, 420, 430. The limiting mechanisms 410, 420, 430 separately include a sleeve body 411, 421, 431 and two extending sections 412, 422, 432. The sleeve body 411, 421, 431 are separately disposed with a through hole 4111, 4211, 4311. The two extending sections 412, 422, 432 are extended in an arc shape in the opposite directions. These extending sections are cooperated to from a ring wall with gaps 4321. The ring wall surrounds the water diversion hole 131, 132, 133 and the two sealing balls 211, 212. And the touch ends 2212, 2222, 2232 are separately sleeved in the through hole 4111, 4211, 4311 of the sleeve body 411, 421, 431 and extended out of the water diversion cavity 120.

The three outlet functions of this embodiment are separately disposed on the outlet surface 500.

Figure 4:
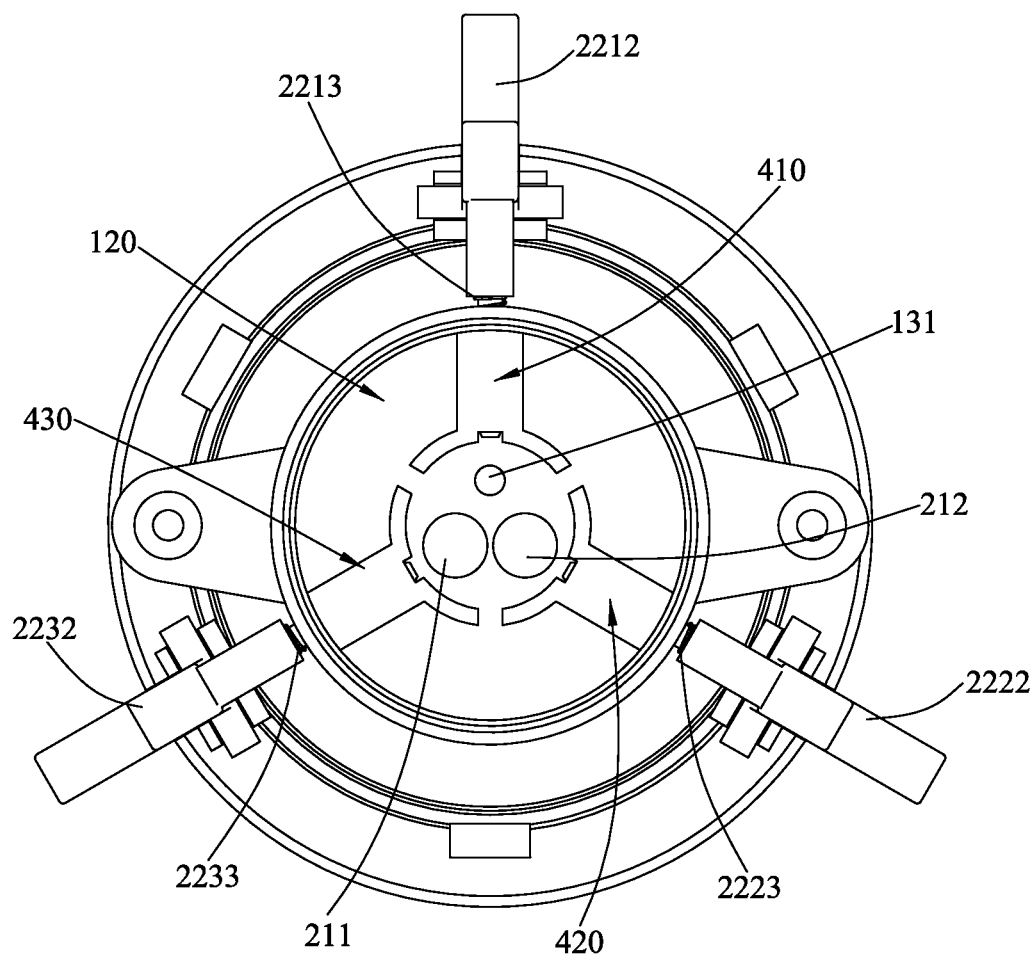
FIG. 4 illustrates the internal structure of the touch switch outlet mechanism of the first embodiment when the second and third water diversion holes are closed by the sealing holes.

The touch switch principle of the outlet mechanism is as below:

FIG. 4 illustrates the internal structure of the first outlet function of the outlet mechanism when the water flows out of the first outlet function. When the user wants outlet function with large discharge, touch the controlled end 2211 of the first touch button 221, making the touch end 2212 sliding to the water diversion cavity 120 inside the through hole 4111 with the pushing of the controlled end 2211 inside the through hole 4111 then to the water diversion cavity 120 inside and pushing the sealing ball 211 or 212 to move from the first water diversion hole 131. So that the sealing balls 211, 212 will close the second and third water diversion holes 132, 133. The first water diversion hole 131 is connected to the water diversion cavity 120, and the water flows out of the first outlet function connected, the second and the third outlet function are closed.

Figure 5:
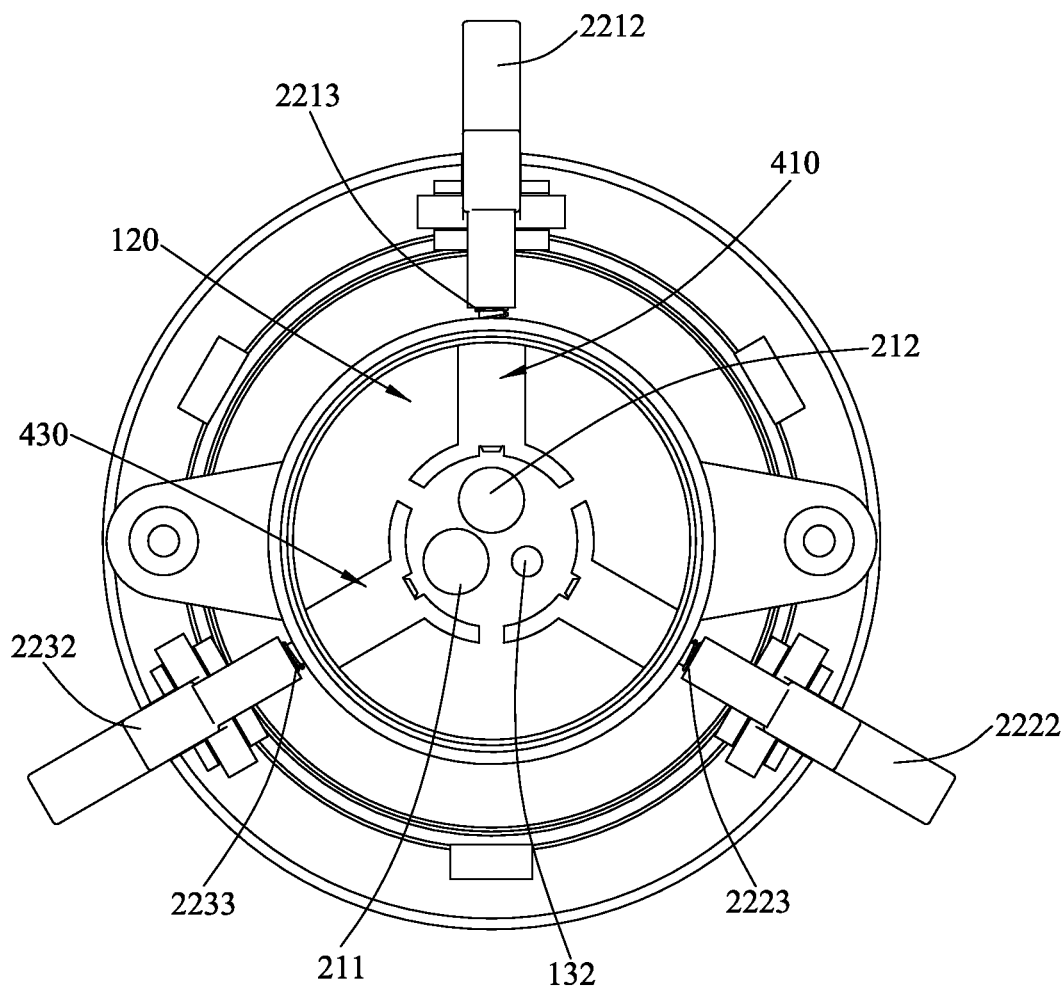
FIG. 5 illustrates the internal structure of the touch switch outlet mechanism of the first embodiment when the first and third water diversion holes are closed by the sealing holes.

When the user wants needle-like water, as figured in the FIG. 5, in the same way, touch the controlled end 2221 of the second touch button 222 to make the touch end 2222 of the second touch button 222 sliding to the water diversion cavity 120 inside the through hole 4211 and push the sealing ball 211 or 212 moving away from the second water diversion hole 132, so that the sealing ball 211, 212 close the first and the third water diversion hole 131, 133, the second water diversion hole 132 will connect to the water diversion cavity 120. So that the water flows out of the second outlet function while the first and third outlet function are closed.

Figure 6:
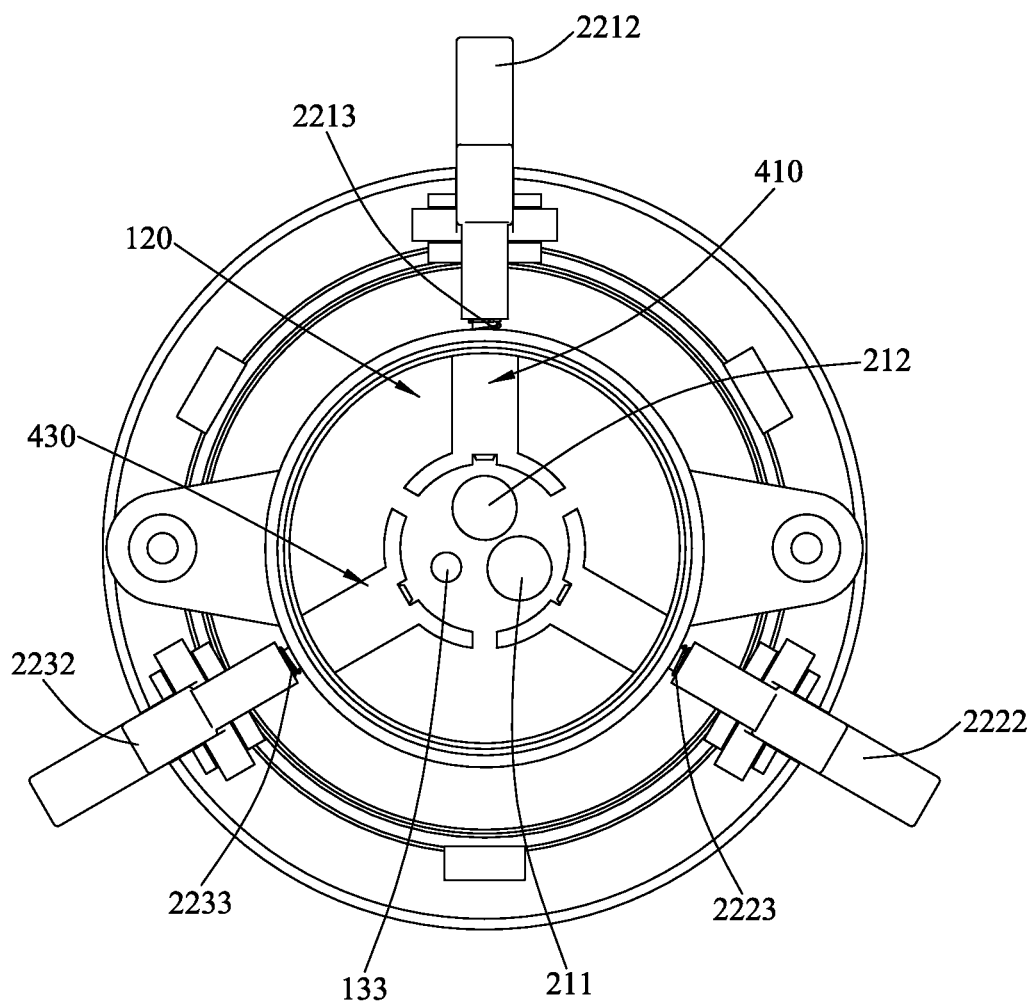
FIG. 6 illustrates the internal structure of the touch switch outlet mechanism of the first embodiment when the first and second water diversion holes are closed by the sealing holes.

When the user wants small water outlet function, as figured in the FIG. 6, touch the controlled end 2231 of the third touch button 223 to make the touch end 2232 of the third touch button 223 sliding to the water diversion cavity 120 inside the through hole 4311 and pushing the sealing ball 211 or 212 moving out of the third water diversion hole 133, so that the sealing ball 211, 212 will close the first and second water diversion hole 131, 132, the third water diversion hole 133 will be connected to the water diversion cavity 120, the water flows out of the third outlet function, and the first and second outlet function are closed.

Although there are only three outlet functions in the outlet mechanism in this embodiment, but not limited, it can be disposed with two outlet functions or more than three. The number of the touch button, the water diversion hole and the sealing ball is adjustable correspondingly.

The Second Embodiment

Figure 7:
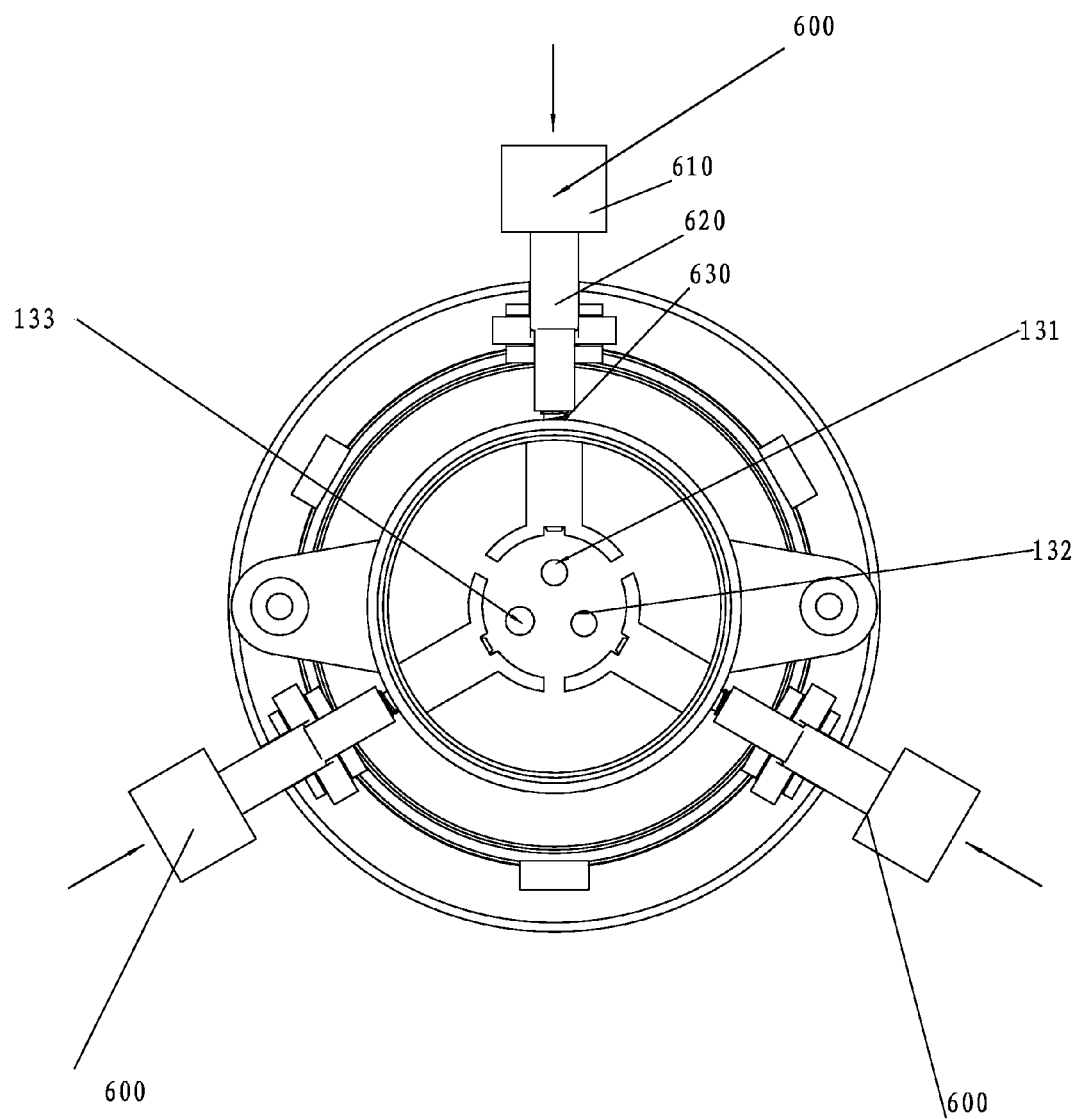
FIG. 7 illustrates the internal structure of the touch switch outlet mechanism of the second embodiment (the sealing ball is not figured out here)

Refer to the FIG. 7, which illustrates another preferred embodiment of the touch switch outlet mechanism of the present invention. The difference from the first embodiment is that the touch button is a button and the controlled end is a button.

Refer to the FIG. 7 and FIG. 2. The touch button 600 of the second embodiment includes a button 610, a touch end 620 and a restore spring 630. The three touch buttons 600 are separately disposed in the control ends of the three outlet functions. The switch of the outlet functions is realized by the different buttons.

The Third Embodiment

Figure 8:
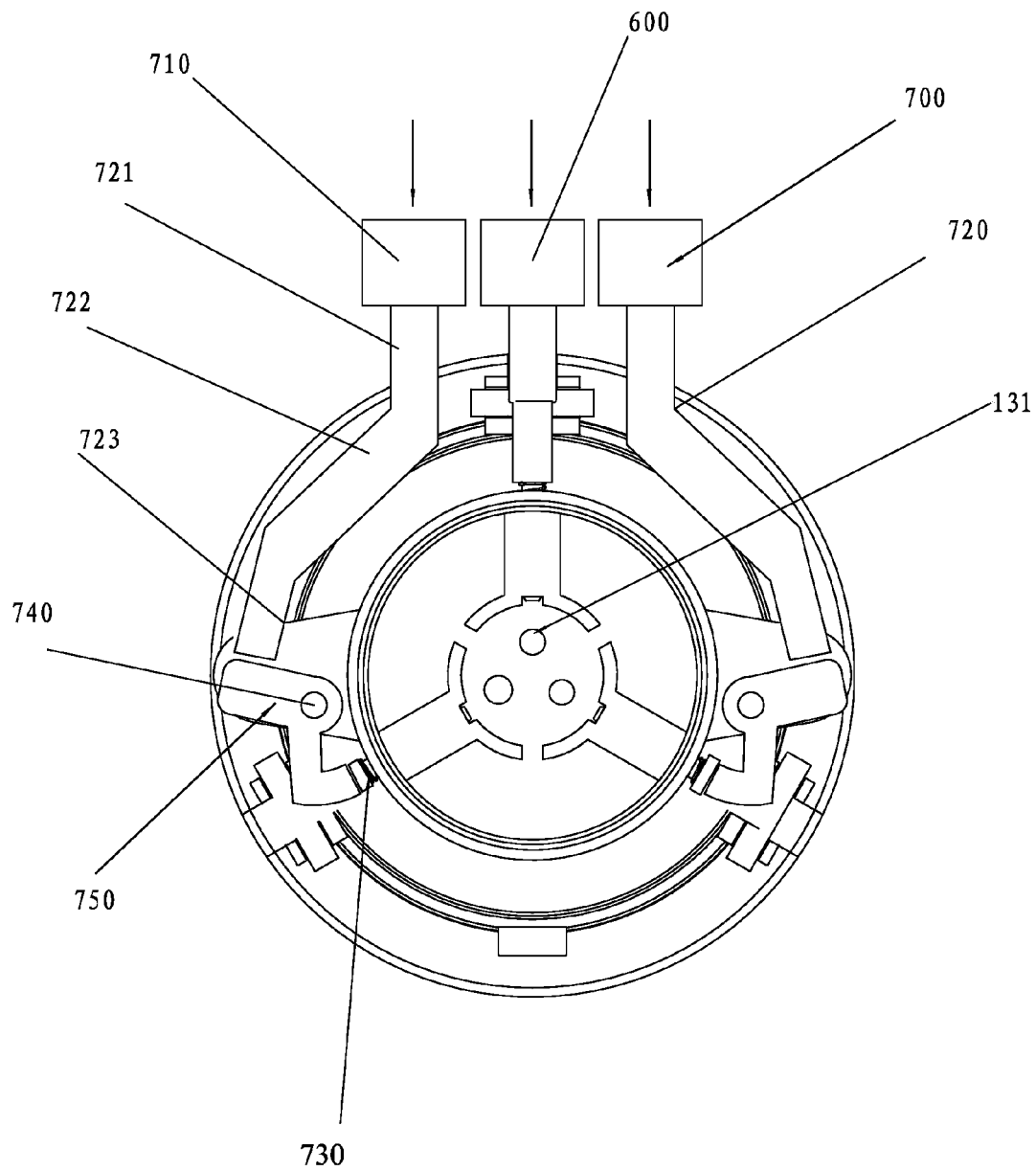
FIG. 8 illustrates the internal structure of the touch switch outlet mechanism of the third embodiment (the sealing ball is not figured out here)

Refer to the FIG. 8, which illustrates another preferred embodiment of the touch switch outlet mechanism of the present invention. The difference from the first embodiment and the second embodiment is that the touch button is a button; the three buttons are disposed in a line.

Refer to the FIG. 8 and FIG. 2. For convenience, in the third embodiment, the three touch buttons are disposed in a line; the central touch button 600 includes a button 610, a touch end 620 and a restore spring 630. The structure is similar to the touch button 600 of the second embodiment. Two sides of the touch buttons 700 are disposed symmetry and separately disposed with a button 710, a touch rod 720, a restoring spring 730, a shaft 740 and a rocker arm 750. The touch rod 720 includes a straight section 721, a middle section 722 and a push section 723. The button 710 is disposed in the top end of the straight section 721; the rocker arm 750 is kept by the shaft 740, the restoring spring 730 is sleeved in the touch end in the lower portion of the rocker arm 710. The switch of different outlet functions is realized by touching different buttons.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

Industrial Applicability

The present invention is provided with a touch switch outlet mechanism, in which the switch of the water diversion holes to connect to the water diversion cavity is realized by the sealing balls moving from one of the water diversion holes to another one by the sliding of the touch button. The present invention is easily controlled and the switch is novel and easy to meet the humanity design trend.

What is claimed is:

1. A touch switch outlet mechanism, wherein the mechanism includes a fixation unit and a switch unit;
   the fixation unit includes an inlet waterway connected to a water source, a water diversion cavity connected to the inlet waterway, N number of water diversion holes connected to the water diversion cavity and several outlet functions with the same number as the water diversion holes and one to one correspondence to the water diversion holes, wherein N is equal to or more than 2;
   the switch unit includes N−1 number of sealing balls and N number of touch buttons, the N number of touch buttons are separately disposed with a touch end inside the water diversion cavity and a controlled end, the touch ends of the N number of touch buttons are corresponding to N number of water diversion holes and slidingly connected to the fixation unit, the N−1 number of sealing balls are configured to seal up N−1 number of the N number of water diversion holes, the switch of the water diversion holes to connect to the water diversion cavity is obtained by the sealing balls moving from one of the water diversion holes to another one by the sliding of the touch button.

2. A touch switch outlet mechanism according to the claim 1, wherein each touch button is disposed with a restore spring withstanding the touch end of the touch button.

3. A touch switch outlet mechanism according to the claim 1, wherein the mechanism further includes a water diversion unit disposed inside the fixation unit, the water diversion unit includes a first water diversion plate and a second water diversion plate stacked vertically.

4. A touch switch outlet mechanism according to the claim 3, wherein the water diversion cavity is disposed inside the first water diversion plate, the water diversion holes are opened in the surface of the first water diversion plate, the surface of the second water diversion plate is disposed with inlet grooves one by one corresponding to the water diversion holes.

5. A touch switch outlet mechanism according to the claim 1, wherein the mechanism further includes a limiting unit, the limiting unit is disposed inside the water diversion cavity.

6. A touch switch outlet mechanism according to the claim 5, wherein the limiting unit includes limiting mechanisms with the same number as the touch buttons, each limiting mechanism includes a sleeve body and two extending sections, the two extending sections are separately extended out of one end of the sleeve body in opposite directions, the extending sections cooperate to form a ring wall with gaps surrounding the water diversion holes.

7. A touch switch outlet mechanism according to the claim 6, wherein the sleeve bodies are separately disposed with a horizontal through hole, the touch ends are separately sleeved inside the through holes and extended out of the through holes into the water diversion cavity.

8. A touch switch outlet mechanism according to the claim 1, wherein the sealing ball is bigger than the aperture of the water diversion hole.

9. A touch switch outlet mechanism according to the claim 1, wherein the fixation unit is a shower, which includes a handle, the inlet waterway is disposed inside the handle.

10. A touch switch outlet mechanism according to the claim 3, wherein an outlet cover is disposed in a lower part of the fixation unit, each inlet groove is disposed with an outlet hole to connect to different outlet functions of the outlet cover.

11. A touch switch outlet mechanism according to the claim 3, wherein the mechanism includes three touch buttons, the controlled ends of which are buttons.

12. A touch switch outlet mechanism according to the claim 11, wherein the three touch buttons are disposed in a line.

13. A touch switch outlet mechanism according to the claim 11, wherein touch buttons on two sides of the three touch buttons are in symmetry and separately disposed with a button, a touch rod, a restore spring, a shaft and a rocker arm; the touch rod includes a straight section, a middle section and a pushing section, the button is disposed in the top end of the straight section; the rocker arm is kept by the shaft, the restore spring is sleeved in the touch end in the lower end of the rocker arm.

* * * * *